US007454004B2

(12) United States Patent
Shvadron

(10) Patent No.: US 7,454,004 B2
(45) Date of Patent: Nov. 18, 2008

(54) METHOD AND SYSTEM FOR VERIFICATION OF REMOTE PARTY IDENTIFICATION

(75) Inventor: Uzi Shvadron, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 10/463,633

(22) Filed: Jun. 17, 2003

(65) Prior Publication Data

US 2004/0258232 A1   Dec. 23, 2004

(51) Int. Cl.
*H04M 3/42* (2006.01)
(52) U.S. Cl. ............................ 379/210.01; 379/207.13; 379/207.14
(58) Field of Classification Search ............ 379/210.01, 379/207.13, 207.14
See application file for complete search history.

(56) References Cited

U.S. PATENT DOCUMENTS 5,131,020 A * 7/1992 Liebesny et al. ......... 455/414.3

OTHER PUBLICATIONS

Lamond, Keith "Credit Card Transactions Real World and Online", Copy 1996 by Keith Lamond, http://www.virtualschool.edu/mon/ElectronicProperty/klamond/credit_card.htm.
Freier, Alan O., et al., "The SSL Protocol Version 3.0", Netscape Communications Corporation, Mar. 1996, http://wp.netscape.com/eng/ssl3/.
Freier Alan O., et al., "The SSL Protocol Version 3.0", Transport Layer Security Working Group, Nov. 18, 1996.

* cited by examiner

*Primary Examiner*—Ahmad F. Matar
*Assistant Examiner*—Karen L Le
(74) *Attorney, Agent, or Firm*—McGinn IP Law Group, PLLC; Gail H. Zarick, Esq.

(57) ABSTRACT

A method for processing a transaction. The method includes receiving validation requests, automatically initiating one or more callbacks to an authorized transactor, and validating one or responses from the authorized transactor. The automatic initiation is in response to the validation requests, and according to pre-selected authorized transactor information. The responses from the authorized transactor are in reply to the callbacks. The validation is based upon the pre-selected authorized transactor information, 1 Claim, 4 Drawing Sheets

METHOD AND SYSTEM FOR VERIFICATION OF REMOTE PARTY IDENTIFICATION

TECHNICAL FIELD

The present invention relates to methods and systems for transaction processing, and more particularly, to methods and systems for transaction validation.

BACKGROUND

With the continued technological advancements in the fields of communication and travel, the world is becoming "smaller and smaller", and more and more transactions are remote transactions, i.e. between a product/service provider and a remote purchaser. Examples of such transactions may be the purchase of a product over the Internet, or the purchase of a service over the telephone. In many instances the payments may be made with a credit card, a debit card, a smart card, or any other technology which affords payment of such types. One of the main problems, for both the provider and the purchaser, is to authenticate the identity of the remote purchaser, or alternatively, to validate that the purchaser has the authority to perform the requested transaction.

One of the common present day solutions for the validation of remote identification is for the provider to limit the transaction to those purchasers who specify a valid billing address. Alternatively, other providers will only allow transactions where the shipping address is identical to the billing address.

These methods have serious limitations. In the most innocent situation, the purchase may be a gift to be sent to an address that is different from that of the billing address. In a less innocent situation, the unauthorized purchaser may be aware of the appropriate billing address associated with the selected form of payment.

As a further limitation, in many cases, the allowable billing addresses are limited to those in a specific country. This is mostly due to the inability of the provider to verify foreign addresses. This scenario limits the ability of the provider to service global trade.

Secured electronic payment processing such as that provided by Secured Sockets Layer technology has other limitations. It requires customers to be registered with at least one certificate authority. It requires complex interaction between different certification authorities, which might use different technologies. It is also limited to electronic commerce.

Another known validation approach is for a person representing the service/product provider to phone the home of the credit cardholder, who is presumably the purchaser, and validate the transaction. The cost to the provider for such an action is an obvious limitation. Additionally, even when such a validation method is used, chances are the cardholder/purchaser may be performing the transaction from a location other than his home, and hence, the cardholder may not be found. The functionality of such a solution is limited.

SUMMARY OF THE INVENTION

Accordingly, in light of the limitations of prior art validation approaches, the present invention provides a transaction processing method and system that comprises an automated verification callback method and system. The callback method, and associated response method, may be selected by the authorized transactor, and known only by himself and a verification service. In alternative embodiments, the authorized transactor may have a verification password stored in an optional password database.

The present invention may be applicable to any action initiated by a remote party, requires identity validation of that remote party. Consequently, one aspect of the present invention provides a method and system to verify that a transaction originator is an authorized transactor.

In addition to the examples listed in the Background, other transaction examples may include service requests or request for access into a secured area, etc. The present invention may apply to any case where the provider lacks or has limited information about the transaction originator, and would like to validate the transaction authority of the transaction originator.

In accordance with an embodiment of the present invention, there is therefore provided a method for processing a transaction. The method includes receiving validation requests, automatically initiating one or more callbacks to an authorized transactor, and validating based on one or more responses from the authorized transactor.

The automatic initiation is in response to the validation requests, and according to pre-selected transaction information associated with the authorized transactor. The responses from the authorized transactor are in reply to the callbacks. The validation is based upon the pre-selected authorized transactor information.

In another aspect of the present invention, the method further includes providing a validation response relating to approval of the validation request, wherein the validation response is in response to the validation requests. The method may also include confirming a password associated with the authorized transactor, wherein the pre-selected authorized transactor information includes the password.

In accordance with an alternative embodiment of the present invention, the present invention provides a transaction processing system including a callback processor and a validation server. In response to one or more validation instructions received from the validation server, and according to the pre-selected authorized transactor information, the callback processor automatically initiates one or more callbacks to the authorized transactor. According to the pre-selected authorized transactor information, the validation server validates the contents of one or more responses from the authorized transactor.

In another aspect of the present invention, the callback processor includes an input/output (I/O) device, a callback interface, and a computer processing unit (CPU). The I/O device receives the instructions and then sends response information. The callback interface activates a callback in a specific method and may receive responses in the same method. The CPU activates and manages the processes of the callback processor using callback management software.

In another aspect of the present invention, the validation server includes an input/output (I/O) device, a memory, and CPU. The I/O device receives one or more requests for validation, sends back validation results, and sends the instructions to the callback processor. The memory holds the pre-selected authorized transactor information. The CPU implements validation processes management.

In some embodiments, the validation processes management are deployed by a computer software product. In other embodiments, the pre-selected transaction information includes a password. In yet other embodiments, the validation server includes the callback processor.

In accordance with an alternative embodiment of the present invention, the present invention provides a computer program embodied on a computer-readable medium. The computer program includes a first segment operative to receive validation requests. The program also includes a second segment, operative to automatically initiate, in response to the validation requests, according to pre-selected transaction information associated with an authorized transactor, one or more callbacks to the authorized transactor. The program further includes a third segment operative to validate, according to the pre-selected authorized transactor information, one or more responses from the authorized transactor, i.e. the responses in reply to the callbacks.

In one aspect of the present invention, the program may also include a fourth segment operative to provide a validation response relating to approval of the validation request; the validation response in response to the validation requests. In another aspect of the present invention, the program includes a fifth segment operative to confirm a password associated with the authorized transactor, wherein the pre-selected transaction information includes the password.

In accordance with an alternative embodiment of the present invention, the present invention provides processing of a transaction; the method includes deployment of the computer program described above.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1A:
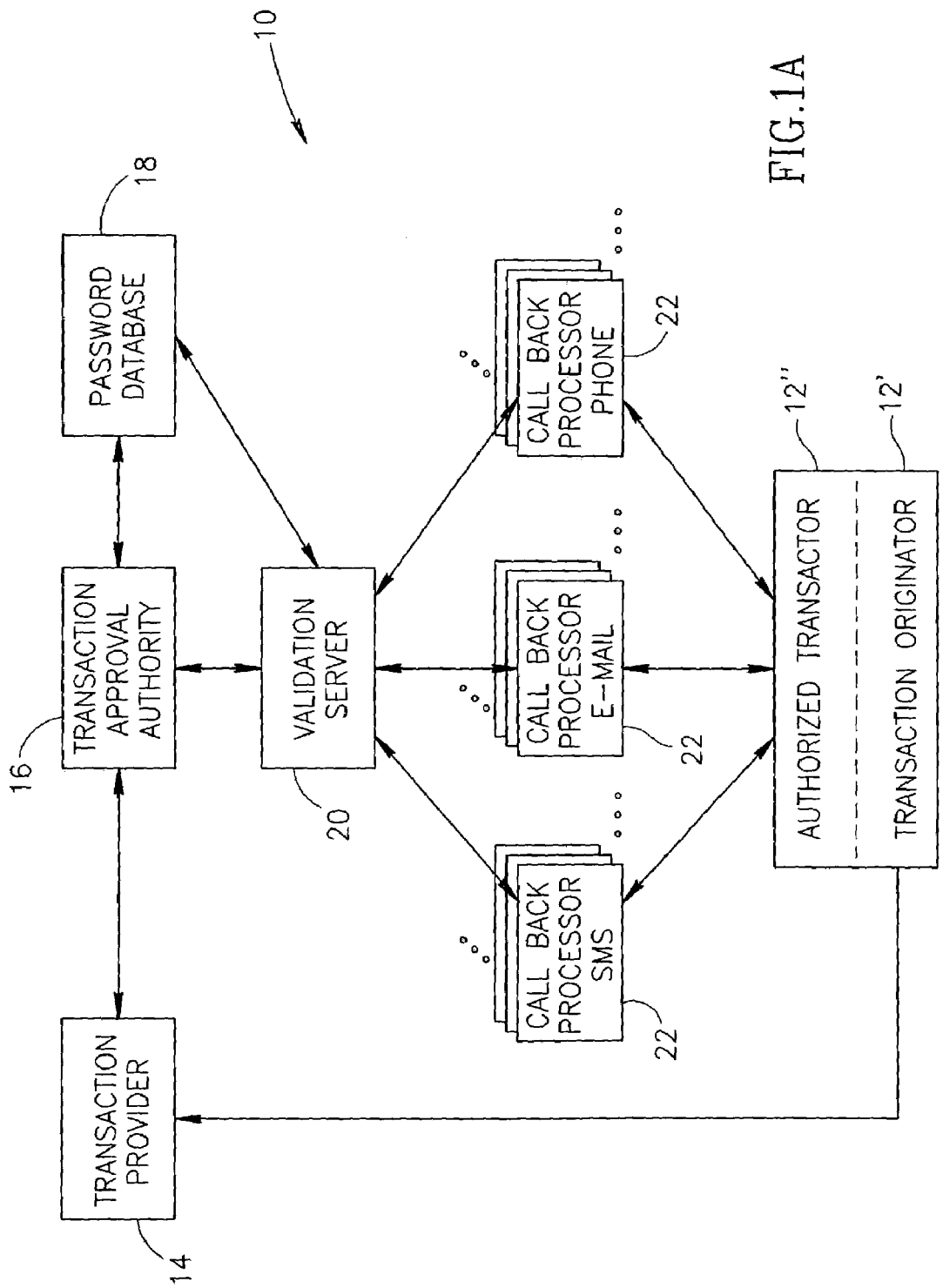
FIGS. 1A and 1B are general block diagrams illustrating a validation system and infrastructure, constructed and operated according to an embodiment of the present invention.
Figure 1B:
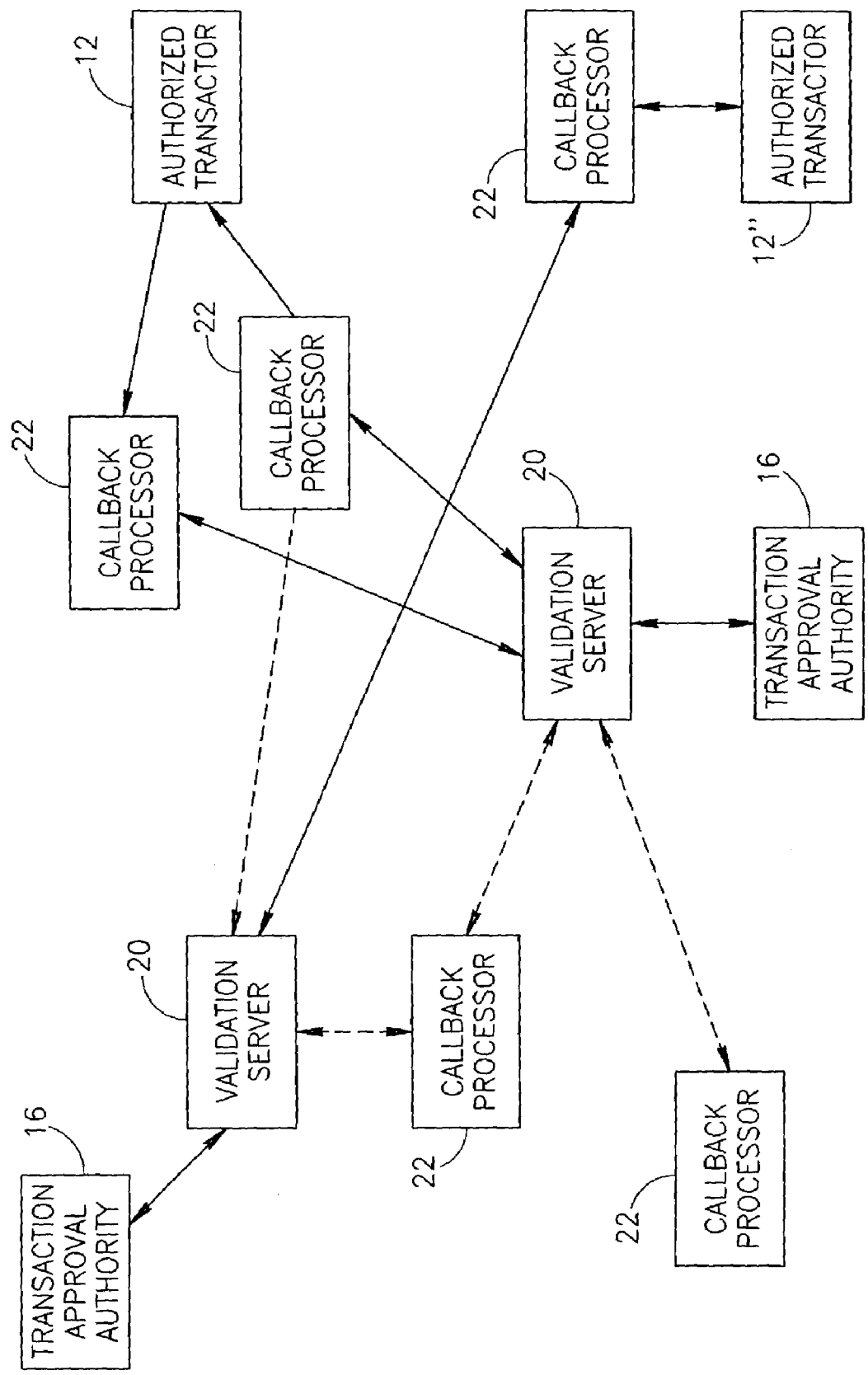
Figure 2:
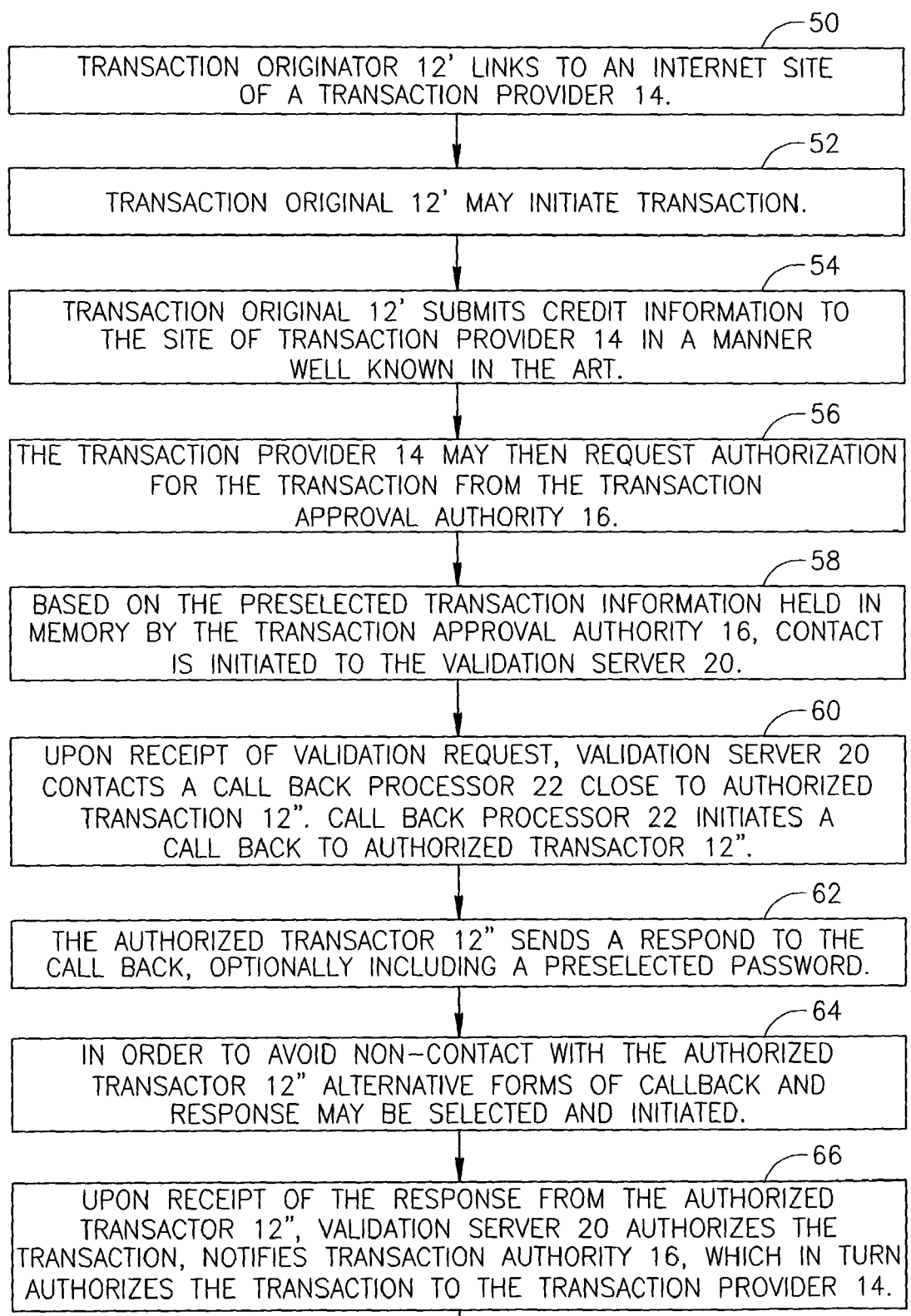
FIG. 2 is a flowchart that details a verification method operated according to an embodiment of the present invention.

Reference is now made to FIGS. 1A, 1B, and 2, block diagrams illustrating verification system 10 and a flow chart illustrating one operative embodiment of present invention, respectively.

System 10 provides verification of remote transaction originator 12'. System 10 is an automated, customizable verification system that allows for user selected callback methods. System 10 enables verification that transaction original 12' is, or is not, an authorized transactor 12". System 10 may comprise one or more optional password databases 18, one or more validation servers 20, and one or more callback processors 22.

In a preferred embodiment of the present invention, a transaction originator 12' may contact a transaction provider 14, initiating a transaction request, such as a service request or the purchase of a product. Transaction originator 12' may communicate with transaction provider 14 via various channels, such as a telephone call, a fax transmission, an Internet site, an e-mail message, etc. Transaction provider 14 may link or contact transaction approval authority 16. Transaction approval authority 16 may be the company responsible for the payment method or the security system.

Transaction approval authority 16 may then deploy the services of system 10, and more specifically, validation servers 20 and callback processors 22. Validation server 20 may hold in memory pre-selected authorized transactor information, such as preferred authorization specifications, the pre-selected callback method, and a pre-selected response method. Alternatively, transaction approval authority 16 may choose to hold the pre-selected authorized transactor information, and thus instruct validation server 20 to carry out and manage the validation process.

Validation server 20 may then contact a callback processor 22, which is capable of carrying out the pre-selected callback method. Call back processor 22 then contacts authorized transactor 12" via the pre-selected callback method. If authorized transactor 12" is transaction originator 12', or if authorized transactor 12" authorizes transaction originator 12' to perform the requested transaction, authorized transactor 12" responds affirmatively to the callback.

In an optional embodiment, authorized transactor 12" may issue authorization with a password. The password may be held in the password database 18. If a password is used, either transaction approval authority 16 or validation server 20 may verify the password with password database 18.

When the response from authorized transactor 12" is received, and the password is validated with password database 18, the transaction is approved.

Upon failure to contact authorized transactor 12", validation server 20 may elect to reinitiate the process and/or choose an alternative pre-selected method of communication with authorized transactor 12".

In a preferred embodiment of the present invention, system 10 and its operation may be fully automated, unless specifically requested otherwise. As such, once transaction originator 12' initiates a transaction, system 10 deploys an automated process in order to validate the identity or authorization of transaction originator 12'. In a preferred embodiment, neither product provider 14 nor transaction approval authority 16 need provide human interaction. A computerized system initiates the callback process, sends the message using the pre-selected callback method and waits for the response via the pre-selected response method.

It is noted that while the above embodiment describes validation server 20 and callback processors 22 as separate entities, in other preferred embodiments, validation server 20 and callback processors 22 may be the same entity. As such, validation server 20 may provide the functions of both validation server 20 and callback processors 22.

It is apparent to those skilled in the art that elements of the present invention may be accomplished by a fully hard wired system, or by a combination of a hard wired and software system. As such, the functions of validation server 20 and callback processors 22 may be implemented by deploying a computer program stored on a computer readable medium, and the functions of validation server 20 and callback processors 22 may be deployed from one or more entities.

In alternative preferred embodiments of the present invention, such as that illustrated in FIG. 1B, system 10 may comprise multiple validation servers 20 and callback processors 22. It is noted that while FIG. 1B shows only a limited number of elements 12, 16, 20 and 22, it is understood that system 10 may operate with numerous authorized transactors 12", transaction originators 12', transaction providers 14 and transaction approval authorities 16. Additionally, system 10 may operate with numerous password databases 18, validation servers 20 and callback processors 22.

In some instances, the authorized transactor 12" may be at a location distant from transaction approval authority 16. Subsequently, transaction approval authority 16 may contact the validation server 20 closest to itself, or one with which it has a contract. In turn, the contacted validation server 20 may activate and manage the callback processor 22 closest to the authorized transactor 12". This optional embodiment may be viable for embodiments wherein the callback and/or response method entail, for example, phone calls, either land lined or cellular.

Alternatively, the selected callback and/or response method may be via the Internet, such as either instant messaging or e-mail. For embodiments such as these, the location of validation server 20 and callback processor 22 may be less critical, and consequently, system 10 may be operated with any of the validation servers 20 or callback processors 22 that have the capacity to perform the selected callback procedure.

Reference is now made to FIG. 2, a flow chart illustrating a common operative example of the present invention. The operative example may entail the purchase of a book over the Internet.

A customer (transaction originator 12') may link (step 50) to an Internet site of a book seller (transaction provider 14). The customer (transaction original 12') may initiate a purchase (step 52) of books and pay with a credit card. The credit card information may be submitted (step 54) to the book seller's site (the site of transaction provider 14) in a manner well known in the art. The book seller (transaction provider 14) may then desire to verify the credit information, or alternatively, to verify the authority of the customer (transaction originator 12') to perform the requested transaction. The book seller (transaction provider 14) may then request authorization (step 56) for the purchase from the credit card company (transaction approval authority 16) via a secured link.

In most instances, the credit card company (transaction approval authority 16) will activate the authorization process, while in other instances, the book seller (transaction provider 14) may deploy system 10 to perform the authorization process. It is noted that in some preferred embodiments, a verification service provider may provide the verification process for either the book seller (transaction provider 14) or the credit card company (transaction approval authority 16).

Based on the transaction information and the authorized transactor information held by the credit card company (transaction approval authority 16), contact on an optionally secure line is initiated (step 58) to the validation server 20. The credit card company may either have a validation server 20 or may use the services of a provider of validation server 20. In some embodiments, validation server 20 may hold in memory the authorized transactor information. Upon receipt of the request from the credit card company, validation server 20 contacts the credit card holder (authorized transactor 12") (step 60) via the appropriate callback processor 22 using the pre-selected method, for example, via an e-mail (initiate the callback).

The credit card holder (authorized transactor 12") replies using the pre-selected response method, such as via e-mail, (respond to the callback) (step 62), or is prompted for a pre-selected password.

In some embodiments, in order to avoid missing a valid transaction due to non-contact with the credit card holder (authorized transactor 12") alternative forms of callback may be selected and initiated (step 64). For example, if there is no response to the initial e mail callback, a SMS message may be sent to the PDA of the credit card holder (authorized transactor 12"). In still other embodiments, the selected callback method may be different from the response method.

Upon receipt of the response from the credit card holder (authorized transactor 12"), validation server 20 authorizes (step 66) the transaction, notifies the credit card company (transaction approval authority 16), which in turn authorizes the transaction to the book seller (transaction provider 14).

The above example is meant to be illustrative of the operation of system 10, while not limiting the complete options of operation. Other possible operations of system 10, such as service requests, access requests, etc., are included within the true scope of this invention. Other forms of communication paths, either in the form of callback, passwords, or responses are also covered within the scope of the current invention.

Selection of a callback method and password

In a preferred embodiment of the present invention, upon receipt of a payment card, credit card, smart card, or other card from the transaction approval authority 16, or when registering with a secure database or facility, authorized transactor 12" may select a callback and response method, and optionally a password. As an example, the callback method, response method and password may be selected either when receiving a credit card or when receiving a work badge to a secured facility. This pre-selected information is then kept in memory either by approval authority 16 or by the validation server 20. The approval authority 16 may select to enable authorized transactor 12" to modify this information when needed. In both cases, it is the responsibility of approval authority 16 to verify the identity of authorized transactor 12" using appropriated means.

The callback method might be any of the following (but not limited to): phone call, fax transmission, e-mail, instant message, SMS to a cell phone, connection to a special application on a computer or a PDA, overland mail, or personal validation. Alternatively, the callback itself may be a different method from the response from authorized transactor 12". The response method may also be any of the above methods but not limited to these methods. The callback and the response list is meant to be illustrative, while not limiting the complete options of callback and response methods. Other possible callback methods are included within the true scope of this invention.

In alternative embodiment, authorized transactor 12" may request that callback be initiated only upon transaction values above a pre-selected threshold. Or alternatively, different callback methods may be selected for different threshold values, e.g., no callback for transactions under $100, SMS for transactions between $100 and $500, and a phone call for transactions over $500. Thus, based on the needs of each authorized transactor 12", the validation process may be limited to significant transactions only. Authorized transactor 12" may be enabled to specify other criteria for validation process initiation. For example, authorized transactor 12" may choose to ask for a verification on any transaction of a specific type of service.

The response from authorized transactor 12" to validation server 20 may be in one or more of several forms, such as: a voice response, with an optional voice recognition system to validate a password, or alternatively, a speaker verification system; a signature response via a fax transmission, optionally using signature verification software; an e-mail response, with an optional alphanumeric password; a link into a new web page, optionally provided via an e-mail and with a requirement for a password; an instant message response, with an optional alphanumeric password; an SMS response, with an optional alphanumeric password; a special application that may reside on a computer or PDA held by the originator—the response would be specific to this application and may prompt the user for a password in an alphanumeric form or a pen based forum or even a finger print forum; a mail response and a personal validation (last two although slow, may be preferred by some non-technical users or may be used in special cases). A form may be provided with directions on how to respond in each method. The response listing is meant to be illustrative, while not limiting the complete options of response methods. Other possible response methods are included within the true scope of this invention.

In yet further alternative embodiments, the authorized transactor 12" may specify several methods for the validation process; each method will be used in turn if the previous methods fail to get a response. Each method may be associated with a password.

The password may be in one or more of several forms, depending on the device used for the response: DTMF digits when a phone is used for the response, alphanumeric if a computerized device is used, voiced password using a phone, real signature sent by a fax or a pen based PDA, or a biomatric method such as finger prints when a capturing device is available. This password listing is meant to be illustrative, while not limiting possible options. Other possible passwords are included within the true scope of this invention.

Validation Server 20 and Callback Processor 22

Figure 3:
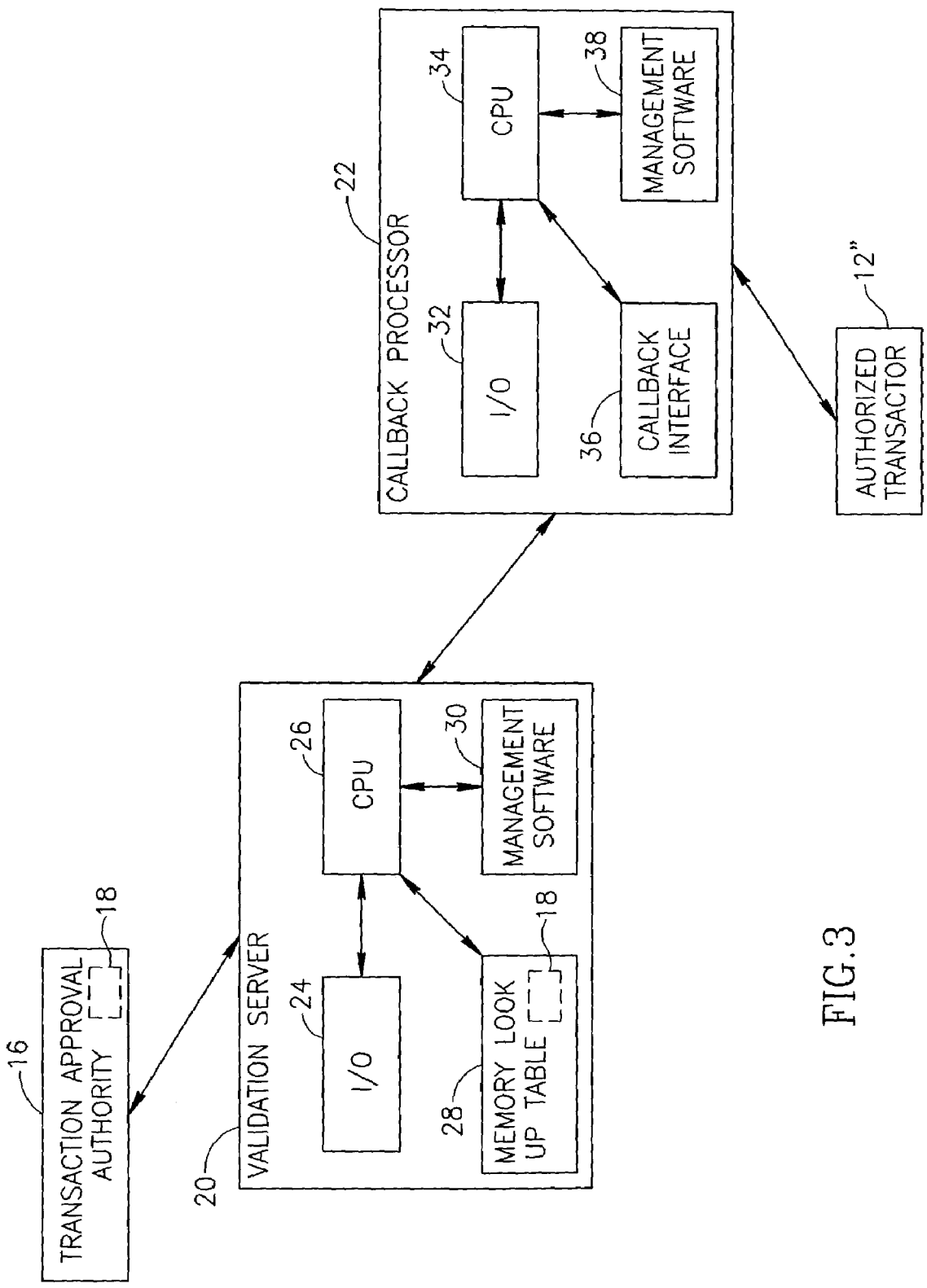
FIG. 3 is an illustration of a validation server and a callback processor, constructed and operated according to an embodiment of the present invention.

Reference is now made to FIG. 3, a block diagram illustrating a model validation server 20 and a callback processor 20. It is noted that FIG. 3 is only a partial illustration of system 10. For ease of understanding, refer also to FIG. 1B.

Validation server 20 may comprise an input/output (I/O) device 24, a computer processing unit (CPU) 26, a memory 28, and validation process management software 30. In some embodiments, password database 18 may be held in memory 28, while in other embodiments transaction approval authority 16 may hold password database 18.

Callback processor 22 may comprise an I/O 32, a CPU 34 and callback interface unit 36 and callback management software 38. Management software 38 manages the processes within callback processor 22.

While not being shown, validation server 20 and callback processor 22 comprise the elements needed for implementation of hardware and software, such as an operating system and a bus. As is known to those skilled in the art, system 10 may be provided either as a hard wired device or as a computer program to be implemented on a hardwired device.

In one preferred embodiment, validation server 20, via I/O 24, receives a request for validation from transaction approval authority 16. I/O 24 may be a network interface card or any other device capable of interface. CPU 26 receives the request from I/O 24. CPU 26 may manage the validation process and implement validation software 30. CPU 26 may consult with memory 28, receiving therefrom the pre-selected callback and response method associated with the requested authorized transactor 12".

CPU 26 activates callback processor 22 with instructions that are sent through the interface between them, optionally through I/O unit 32. CPU 26 may also activate a second callback processor 22, the duty of which is to receive the response from authorized transactor 12".

I/O device 32 of callback processor 22 receives the instruction from validation server 20, which is then transferred to CPU 34. The instruction transferred to CPU 34 contains information relating to the callback or response.

CPU 34 activates callback interface 36, which connects with the appropriate communication provider, for eventual contact with authorized transactor 12". For example, if the pre-selected callback method is an e-mail, callback interface 36 may be a mail sender that sends an e-mail through an Internet provider. Alternatively, if the pre-selected method is an SMS message to the personal digital assistant (PDA), callback interface 36 may be an SMS sender that sends an SMS through a cellular telephony provider.

In some embodiments, if contact can not be made with authorized transactor 12" using the initial pre-selected callback method, callback processor 22 notifies validation server 20, which may then initiate alternative forms of callback.

Upon receipt of the message from callback processor 22, authorized transactor 12" responds to the same or other callback processor 22 according to the chosen response method. Interface 36 receives the response, and sends it on to validation server 20 using I/O 32. CPU 26 processes the response, validating it with a lookup table held in memory 28. It is noted that a lookup table may be alternatively replaced with a database or any other method of holding information. It is additionally noted that the validation information may alternatively be held by transaction approval authority 16 and transferred to validation server 20 upon need.

CPU 26, via I/O 24, sends a message to transaction approval authority 16. The message may be a recommendation to approve, or not approve, the transaction. Alternatively, the message may request further information, or notify of a failure to contact authorized transactor 12". The message may also contain further information related to either the transaction or authorized transactor 12".

While the present specification has been described with reference to one or more specific embodiments, it is not meant to be limiting. It is noted that while product provider 14 and transaction approval 16 authority are noted herein as separate entities, in other embodiments they may be the same entity. Additionally, while the present invention describes validation server 20 and password database 18 as separate entities, in other embodiments they may be the same entity.

It is appreciated that one or more of the steps of any of the methods described herein may be omitted or carried out in a different order from that shown, without departing from the true scope of the invention.

While the methods and apparatus disclosed herein may have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true scope of the invention.

The invention claimed is:

1. A method of processing a transaction, the method comprising:

using one of an Internet site and an e-mail message to originate communication between a transaction originator and a transaction provider, said transaction originator initiating a transaction request with said transaction provider, said transaction provider contacting a transaction approval authority, said transaction approval authority deploying a validation server and a callback processor to determine whether said transaction provider has approval to fulfil said transaction request of said transaction originator, said callback processor contacting an authorized transactor to gain approval to fulfil said transaction request of said transaction originator, said authorized transactor responding to said callback processor with a password;

using a computer processing unit (CPU) of said callback processor of a transaction processing system to activate and manage a plurality of processes of said callback processor using callback management software;

using a validation input/output (I/O) device of said validation server of said transaction processing system to receive validation requests and to send instructions to said callback processor, said validation I/O device comprising a network interface card;

using a callback I/O device of said callback processor to receive said instructions from said validation I/O device;

using a callback interface of said callback processor to initiate automatically, in response to said validation requests, according to pre-selected authorized transactor information, one or more callbacks to an authorized transactor;

using a CPU of said validation server to implement validation processes management, said validation processes management deployed by a computer software product;

using said validation server to validate, according to said pre-selected authorized transactor information, one or more responses from said authorized transactor, said responses being in reply to said callbacks, said validation server confirming said password associated with said authorized transactor, said pre-selected authorized transactor information comprising said password, said validation server comprising a memory to hold said pre-selected authorized transactor information, said password comprising one of an alphanumeric password, a voiced password, a signature sent by facsimile, and finger prints of said authorized transactor; and providing a validation response relating to approval of said validation request, said validation response being in response to said validation requests, wherein said CPU consults with said memory, receiving therefrom a pre-selected callback and response method associated with said authorized transactor;

wherein said validation server elects to contact said authorized transactor again if said validation server fails to contact said authorized transactor on an initial communication attempt, wherein functions of said validation server and said callback processor is implemented by deploying a computer program stored on a computer readable medium, wherein said transaction request comprises one of service request and a purchase of a product, wherein said CPU comprises a look up table in said memory that is used in processing said responses of said authorized transactor, wherein said transaction originator comprises a customer, wherein said transaction provider comprises said Internet site of said book seller, wherein said transaction originator provides credit card information with said transaction request, wherein said transaction provider verifies said credit card information and an authority of said transaction originator to use said credit card information for said transaction request, wherein said transaction approval authority comprises a credit card company, wherein said transaction provider requests authorization for said transaction request from said transaction approval authority via a secured link, wherein said transaction approval authority uses said validation server to approve said transaction request, wherein said responses by said authorized transactor comprise one of a voice response with a voice recognition system to validate said password, a signature response via a fax transmission using signature verification software, an e-mail response with said alphanumeric password, a link into a new web page, an instant message response with said alphanumeric password, wherein said authorized transaction supplies said validation server with a plurality of methods of validation, wherein said method is fully automated and does not require human interaction, and wherein said authorized transactor comprises a credit card holder.

* * * * *